US012586062B2

(12) United States Patent
Tierney et al.

(10) Patent No.: US 12,586,062 B2
(45) Date of Patent: Mar. 24, 2026

(54) MULTI-BLOCKCHAIN TOKEN REBALANCER

(71) Applicant: Circle Internet Financial, Inc., Boston, MA (US)

(72) Inventors: Erik Tierney, Lexington, MA (US); Marcus Boorstin, Cambridge, MA (US); Huawei Gu, Wellesley, MA (US)

(73) Assignee: Circle Internet Financial, Inc., Boston, MA (US)

( * ) Notice: Subject to any disclaimer, the term of this patent is extended or adjusted under 35 U.S.C. 154(b) by 227 days.

(21) Appl. No.: 17/466,900

(22) Filed: Sep. 3, 2021

(65) Prior Publication Data

US 2023/0073883 A1 Mar. 9, 2023

(51) Int. Cl.
G06Q 20/38 (2012.01)
H04L 9/32 (2006.01)
H04L 9/00 (2022.01)

(52) U.S. Cl.
CPC ... G06Q 20/38215 (2013.01); G06Q 20/3827 (2013.01); G06Q 20/3829 (2013.01); H04L 9/3213 (2013.01); H04L 9/50 (2022.05); H04L 2209/56 (2013.01)

(58) Field of Classification Search
CPC ..... H04L 9/50; H04L 2209/56; H04L 9/3213; G06Q 20/3829; G06Q 20/3827; G06Q 20/38215
See application file for complete search history.

(56) References Cited

U.S. PATENT DOCUMENTS

| | | | |
|---|---|---|---|
| 2019/0306235 A1* | 10/2019 | Veale | H04L 63/123 |
| 2020/0042995 A1 | 2/2020 | Snow et al. | |
| 2021/0241243 A1* | 8/2021 | Wiklof | G06Q 20/0655 |
| 2023/0018175 A1* | 1/2023 | Kaplan | G06Q 20/3676 |

FOREIGN PATENT DOCUMENTS

EP 4195127 A1 * 6/2023 ......... G06Q 20/3829

OTHER PUBLICATIONS

Park; DAG-Based Distributed Ledger for Low-Latency Smart Grid Network; Energies (Basel), Sep. 2019, vol. 12 (18), p. 3570.*
PCT/US2022/042530, International Search Report and Written Opinion dated Dec. 9, 2022, 13 pages.

* cited by examiner

*Primary Examiner* — Ilse I Immanuel
(74) *Attorney, Agent, or Firm* — Patterson + Sheridan, LLP

(57) ABSTRACT

Certain aspects of the present disclosure provide techniques for multi-blockchain token rebalancing. According to certain embodiments, a target ratio defining a first quantitative relationship between an amount of a token present is determined for each of a plurality of blockchains. A current amount of the token is received for a first blockchain, and in some embodiments, a first ratio is generated for the token present on each of the plurality of blockchains, based on the current amount. The current amount is compared to the target ratio to generate a ratio difference. Based on the ratio difference, a rebalancing transaction is executed on the first blockchain to bring the amount of the first token closer to the target ratio for the first blockchain.

9 Claims, 6 Drawing Sheets

200 —

400
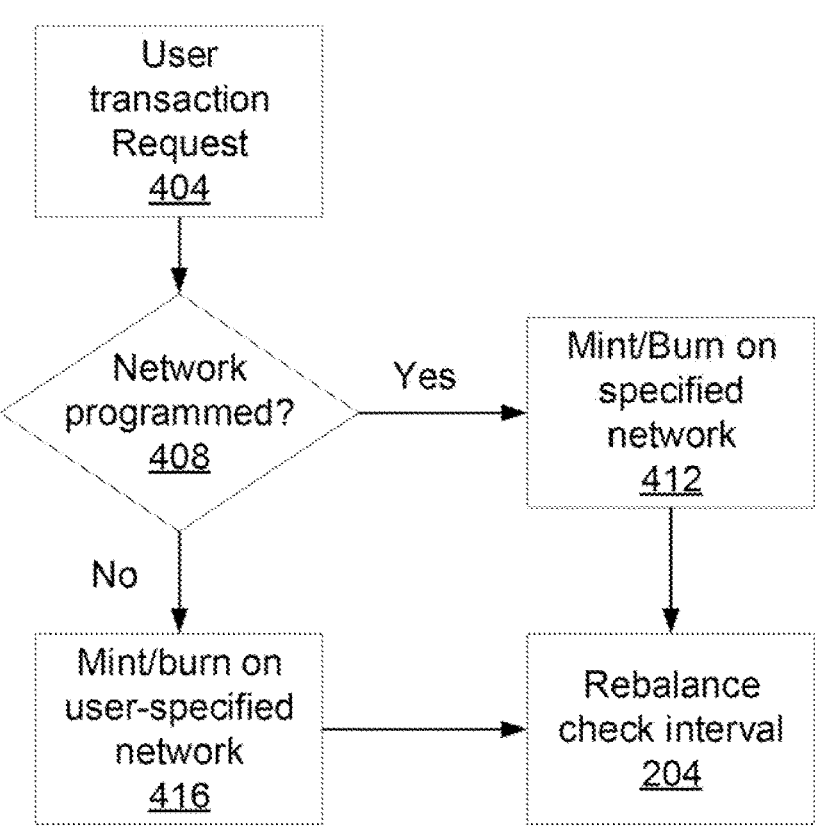
FIG. 4

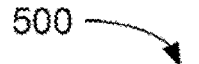

500

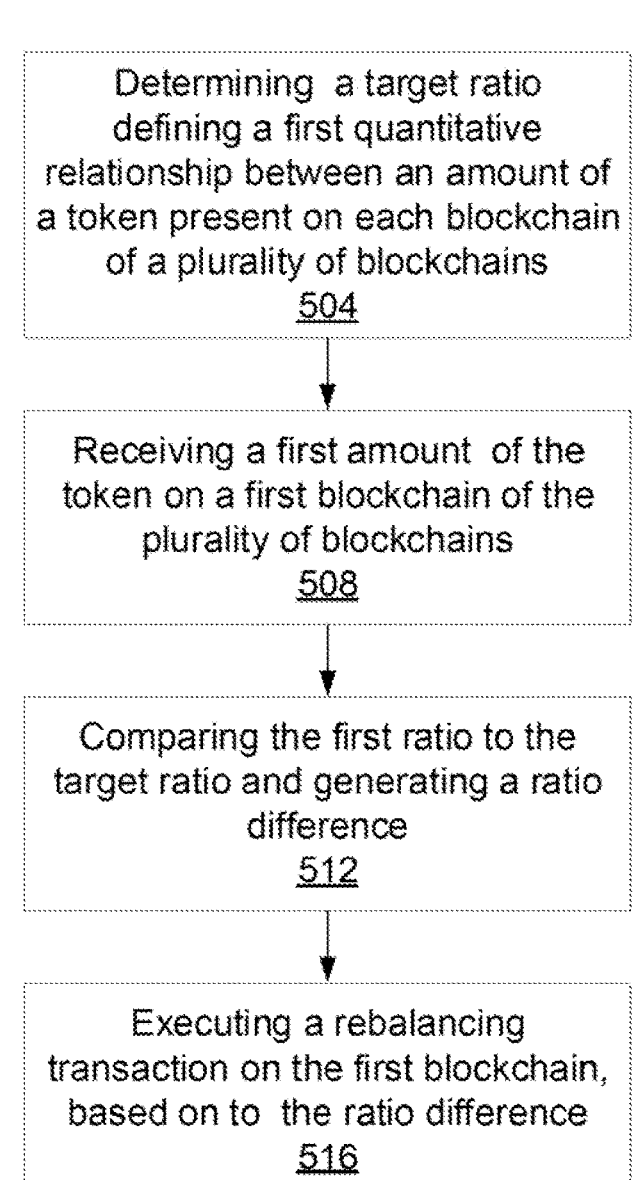

Determining a target ratio defining a first quantitative relationship between an amount of a token present on each blockchain of a plurality of blockchains
504

Receiving a first amount of the token on a first blockchain of the plurality of blockchains
508

Comparing the first ratio to the target ratio and generating a ratio difference
512

Executing a rebalancing transaction on the first blockchain, based on to the ratio difference
516

I/O DEVICES
612

NETWORK 614

PROCESSING SYSTEM
600

CPU 602

I/O DEVICE
INTERFACE 604

NETWORK
INTERFACE 606

BUS
616

MEMORY 608

DETERMINING
COMPONENT 618

RECEIVING COMPONENT
620

COMPARING
COMPONENT 624

EXECUTING
COMPONENT 626

STORAGE 610

TARGET RATIO DATA 628

TOKEN DATA 630

BLOCKCHAIN DATA 632

TOKEN AMOUNT DATA
634

RATIO DIFFERENCE
DATA 638

REBALANCING
TRANSACTION DATA 640

MULTI-BLOCKCHAIN TOKEN REBALANCER

Aspects of the present disclosure relate to cryptocurrency networks, and more particularly to maintaining a ratio distribution of a token across multiple cryptocurrency networks.

As cryptocurrencies and related blockchain technologies become part of modern transaction and management systems, the number of products enabling interaction with multiple blockchains is increasing. When a user onboards legacy currency to such a product, she expects to convert her legacy currency to a cryptocurrency, also referred to as a token herein, and interact with one of a number of existing blockchains.

A number of tokens may be utilized for transactions across multiple blockchains whose value is pegged to one or more legacy currencies, commodities, an algorithm, or another value peg; these tokens are sometimes referred to as stablecoins. When transacting in such a token across multiple blockchains, the entity responsible for maintaining the value peg must be mindful to only mint and burn tokens in accordance with the reserves of the value peg instrumentality. For example, the entity may only mint a number of tokens pegged 1:1 to the US Dollar as it has in US Dollar reserves.

Conventionally, when entities receive a request to onboard a legacy currency that will be subsequently transferred in the form of a token described above to one of many blockchains, they reactively mint new tokens on the user's selected blockchain. Concomitantly, they may need to reactively burn tokens on a different blockchain in order to maintain the number of tokens relative to the value peg. This reactive mint/burn process, in addition to the users requested transaction to deposit the token on the selected blockchain, results in a time-consuming set of transactions that are opaque to the user, as well as resulting in high transaction fees (e.g., the sum of fees for multiple transactions to the user). Moreover, these may be compounded if one or more of the transactions is not successfully completed by the selected blockchain.

Accordingly, what is needed are methods and systems to overcome the shortcomings of conventional approaches.

BRIEF SUMMARY

Certain embodiments provide a method that includes determining a target ratio defining a first quantitative relationship between an amount of a token present on each blockchain of a plurality of blockchains, receiving a current amount of the token on a first blockchain of the plurality of blockchains. The method further includes comparing the current amount to the target ratio and generating a ratio difference, and executing a rebalancing transaction on the first blockchain, based on the ratio difference.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of one or more embodiments and are therefore not to be considered as limiting the scope of this disclosure.

FIG. 4 depicts a flow diagram of a user transaction request, according to certain embodiments.

FIG. 5 depicts a method for multi-blockchain token rebalancing, according to certain embodiments.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
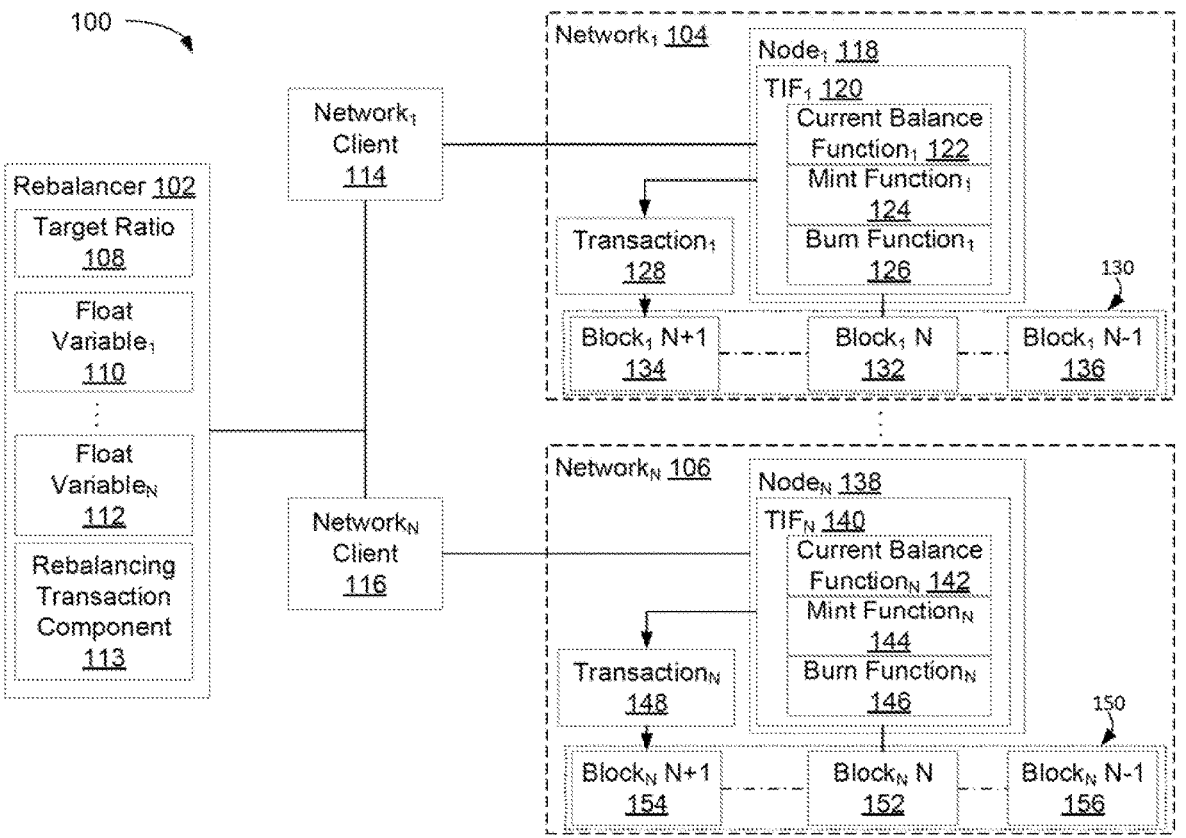
FIG. 1 depicts a system for a multi-blockchain token rebalancer, according to certain embodiments.

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered an element or limitation of the appended claims except where explicitly recited in a claim(s).

Aspects of the present disclosure provide apparatuses, methods, processing systems, and computer-readable mediums for multi-blockchain token rebalancing. According to certain embodiments, a target ratio defining a first quantitative relationship between an amount of a token present is determined for each of a plurality of blockchains. A first amount of the token is received for a first blockchain, and a first ratio is generated for the token present on each of the plurality of blockchains, based on the first amount. The first ratio is compared to the target ratio to generate a ratio difference. Based on the ratio difference, a rebalancing transaction is executed on the first blockchain to bring the amount of the first token closer to the target ratio for the first blockchain.

A blockchain in this context is a data structure in which a growing list of records, called blocks, record transactions made in a cryptocurrency, such as the token discussed herein. The blockchain is typically maintained across several computers that are linked in a peer-to-peer network. According to certain embodiments, one or more blocks of the blockchain may be maintained in a single centralized computer. Each block contains a cryptographic hash of the previous block, a timestamp, and transaction data. As each block contains information about the block previous to it, they form a logical chain. Blockchains are typically managed by a peer-to-peer network and used as a publicly distributed ledger, where nodes in the network utilize a common protocol to communicate and validate new blocks.

In developing products that enable transactions with cryptocurrency tokens across multiple blockchains, developers are mindful to ensure that the amount of a token issued relative to token and/or pegged value reserves across the blockchains is not violated. According to certain embodiments, the token may be a stablecoin that is pegged to the value of one or more assets, such as legacy currencies, commodities, or whose value is algorithmically determined. In embodiments based on an asset reserve, the total number of tokens issued may not exceed the value of the underlying asset. According to other embodiments, pegged or non-value pegged tokens may benefit from the disclosure herein that are required to comply with reserve amounts of the token held by, or under the control of, the issuing entity.

For example, BITCOIN may exist natively and be used in transactions on the BITCOIN blockchain, but may not be used as such on other blockchains, such as ETHEREUM. However, Wrapped BITCOIN may be minted on the ETHEREUM blockchain against a reserve of BITCOIN. In this example, the total number of Wrapped BITCOIN on the ETHEREUM blockchain may not exceed the BITCOIN asset reserve. As a user moves her BITCOIN between different networks (either as BITCOIN on the BITCOIN network or Wrapped BITCOIN on other networks), systems for balancing/rebalancing Wrapped BITCOIN on the various networks may be performed in accordance with disclosed embodiments.

Returning to the example of a token pegged against a legacy currency reserve, developers seek to provide a good user experience around their products, in which a user may deposit legacy currency in exchange for the token and then transfer the token to one of the multiple blockchains in order to conduct transactions. Conventionally, developers have reactively minted and burnt the token as needed so as to not violate reserve requirements using a slow process that requires calling a support person acting on behalf of the issuer of the token and asking for the minting/burning of the token to occur on a particular blockchain. In this context, a token is created (e.g., added to the total token amount) when it is minted, and deleted (e.g., removed from the total token amount) when it is burnt. Mint and burn functions are typically provided either as native token functionality in a cryptocurrency network or by a smart contract in a cryptocurrency network, and is discussed further below.

According to embodiments disclosed herein, methods and systems are described that periodically query current balance functions for the token via token implementation functions (TIFs), for the amount of the token present on each of multiple blockchains. The amount of the token on each blockchain is compared to a target ratio for the amount of all tokens across all supported blockchains, relative to asset reserves. A TIF, having the current balance function, on some blockchains may be in the form of a smart contract, while on other blockchains, this may be a set of primitive functions native to the blockchain. Where an amount of the token on one of the blockchains is out of balance with the target ratio, an amount of the token is minted (or burned) to bring the token amount into compliance with the target ratio. According to certain embodiments, the amount of tokens may fluctuate relative to the target ratio for each blockchain by a float variable amount of the token for each blockchain, removing a requirement of adherence to the target ratio. The float variable in this context provides flexibility for the amount of the token to accommodate ongoing transactions involving the token on a given blockchain.

A TIF may be native token functionality of a given network for tracking, minting, and burning the token. Cryptocurrency networks such as ALGORAND and STELLAR implement token native functionality. Other types of cryptocurrency networks such as ETHEREUM utilize smart contracts for TIF functionality.

By periodically rebalancing the amount of the token on each supported blockchain, when a user exchanges legacy currency for tokens (or vice-versa) on one of the blockchains, the token amount may be immediately transferred to, or withdrawn from, the user's wallet on the desired blockchain. Moreover, by proactively maintaining balances of the token across multiple blockchains based on the target ratio, transaction fees may be kept low for users as additional mint/burn transactions may be avoided.

Example System

FIG. 1 depicts a system 100 for a multi-blockchain token rebalancer, according to certain embodiments. System 100 includes a rebalancer 102 for maintaining a distributed balance of a token, such as a cryptocurrency token, across multiple selected cryptocurrency networks, such as network$_1$ 104 through network$_N$ 106 according to a target ratio 108. Target ratio 108 in this context is the desired quantitative relationship between the amount of the token on each selected network (e.g., network selected for inclusion in system 100), relative to a defined reserve amount of the token (e.g., based on an asset value peg). The total amount of the token across all networks may not exceed the defined reserves.

For example, the value of a token is pegged 1:1 to the value of the US Dollar, and $1000 USD are held in reserves, potentially making a total of 1000 tokens available across selected networks (e.g., networks chosen to be part of the system). The desired amount of the token on a first network is 800 tokens (80% of the total amount of tokens), a second network is 150 tokens (15%), and a third network is 50 tokens (5%). In this example, the target ratio may be expressed as 0.80:0.15:0.5.

The rebalancer 102 is a computer system that may be a discrete processing system made up of components such as a CPU, memory, storage, I/O, and network interfaces, or a distributed computing system implemented across multiple discrete processing systems or in a cloud environment. The total number of tokens available across each of the multiple blockchains according to certain embodiments may not exceed the defined reserve amount of the token. The reserve amount may be determined by a legacy currency, a commodity, another cryptocurrency, by algorithm, or other means to define a reserve amount that limits the total supply. According to certain embodiments, the token is a stablecoin pegged to the value of a legacy currency such as the US Dollar, Euro, Pound Sterling, Yuan, or other national currency under the control of a sovereign state, or a combination of two or more legacy currencies.

For example, a token may be pegged to the value of one US dollar, and thus the total number of tokens may not exceed the reserve amount of US Dollars held to back the token; cryptocurrency tokens such as USDC, TETHER (USDT), TRUEUSD (TUSD), BINANCE USD (BUSD), and GEMINIUSD (GUSD) are examples. Tokens pegged to other legacy currencies include EURS, jEUR, sEUR, EURO TETHER pegged to the Euro; bitCNY and QCASH pegged to the Yuan; TERRAKRW pegged to the Korean Won; the JARVIS SYNTHETIC BRITISH POUND (JGBP) is pegged to the Pound Sterling.

In a further example, the token may be pegged to the value of a defined amount of a commodity; cryptocurrency tokens such as PAX GOLD (PAXG) is pegged to the US Dollar value of an ounce of gold, and DIGITAL OIL (OIL) is pegged to the price of 1 barrel of oil.

In a further example, the token may be pegged to the value of a cryptocurrency, such as DAI from MAKER that is pegged to the value US dollar value of ETHEREUM. In a further example, networks may transact natively using tokens designed for that network, such as ERC20 tokens used on the ETHEREUM network. In order for BITCOIN (BTC) to be used as a token on ETHEREUM, BITCOINs transferred to ETHEREUM are held in an asset reserved, with a wrapped BITCOIN (WBTC) minted for each BTC; each WBTC is pegged to the value of BTC in this context, and the total number of WBTC may not exceed the number of BTC held in reserve.

In a further example, the token value may be algorithmically determined, such as AMPLEFORTH (AMPL).

The number of networks making up $network_1$ 104 through $network_N$ 106 is selected by the designers of system 100 and may be any grouping of cryptocurrency networks. By way of example and not limitation, cryptocurrency networks include ETHEREUM, SOLANA, TRON, ALGORAND, STELLAR, and many others now known or later developed, as well as networks that are aggregations of other networks.

Target ratio 108 is a ratio of the quantitative relationship describing the desired distribution of the token across the selected networks, such as $network_1$ 104 through $network_N$ 106. This ratio may be set manually by a user of the rebalancer 102, for example, based on transaction sizes and volumes across the selected networks. Alternatively, target ratio 108 may be algorithmically set based on the transaction volume per unit of time (e.g., M transactions per second/minute/hour) and amount of the token transacted across the selected networks. By way of example, in embodiments having three networks, the target ratio may be X:Y:Z, where the sum of X, Y, and Z are 1 (e.g., 100%), or about 1+/1 0.05, as there may be factors relating to the token, or the selected networks, that that prevent the sum from being exactly 1. The desired amount of tokens for each network may be determined by multiplying the total amount of tokens (e.g., based on the reserve asset) by the target ratio.

When there is a difference between the amount of the token on a given network and the desired amount as indicated by the target ratio 108, the system 100 initiates a rebalancing action based on this ratio difference, discussed further below. According to certain embodiments, the ratio difference may be determined in absolute token amounts on the given network relative to the target ratio. Alternatively or additionally, the ratio difference may be determined by obtaining the amount of the token on each network and determining a current ratio of token distribution, and comparing the current ratio to the target ratio 108, determining a difference in these ratios. One of skill in the art will appreciate there may be many ways of developing the ratio difference value in this context.

Rebalancer 102 further includes a $float\ variable_1$ 110 through $float\ variable_N$ 112, that each corresponds with a $network_1$ 104 through $network_N$ 106. The float variable serves to modify the target ratio 108 for each respective network within a range of the target ratio value for a given network. By providing a float variable, the total amount of the token in a given network may fluctuate about the target ratio by the float variable value for that network before triggering a rebalancing action. According to certain embodiments, the float variable may be represented as a percentage (e.g., 0.03 or 3%) similar to the target ratio 108 values, in absolute token amounts (e.g., 300,000 tokens), or a combination of these or other expressions that provides a value for the token amount on a network to fluctuate about the target ratio value for the network.

Rebalancer 102 further includes a rebalancing transaction component 113 that generates rebalancing transactions and rebalancing counter-transactions, discussed below in connection with FIG. 3.

System 100 further includes two or more network clients, such as $network_1$ client 114 through $network_N$ client 116 for providing data to and from $network_1$ 104 thought $network_N$ 106, respectively. The network clients are configured to function with a particular network, its nodes, and its blockchain.

$Network_1$ 104 includes a $node_1$ 118 that according to certain embodiments, may be a proof of work miner, a proof of stake anchor node, or another processing system capable of executing functions as described herein within the $network_1$ 104. A network in this context may be a cryptocurrency network that includes a blockchain for securely storing transactions on the network involving one or more cryptocurrencies. The network includes a number of nodes that perform processing operations (e.g., proof of work, proof of stake, oracle, data transport, processing such as video processing) and store copies of the network blockchain. A node is a computer that may be a discrete computing system or implemented on a distributed computing system.

$Node_1$ 118 includes a token implementation $function_1$ ($TIF_1$) 120 that implements the token within $network_1$ 104 and provides related functionality related to the token. These functions include and are not limited to a current balance $function_1$ 122 that tracks the total number of tokens on the network, a mint $function_1$ 124 that generates new tokens for use in transactions within the network, and a burn $function_1$ 126 that deletes tokens from the network. According to certain embodiments, the current balance $function_1$ 122 includes the current amount of the token on the $network_1$ 104, plus the number of tokens pending creation by the mint $function_1$ 124, less the number of tokens pending deletion by the burn $function_1$ 126, as shown in the following example function:

$$current\ balance = current\ token\ amount + pending\ mint\ function\ token\ amount - pending\ burn\ function\ token\ amount \qquad (1)$$

These functions are carried out on the $network_1$ 104 via one or more transactions, such as $transaction_1$ 128, that are stored in a $blockchain_1$ 130 comprising an arbitrary number of blocks such as $block_1$ N 132, $block_1$ N+1 134, and $block_1$ N-1 136. It is understood that $transaction_1$ 128 may be included in the current block, depicted as $block_1$ N+1 132, prior to the current block being added to the blockchain.

As described herein, two or more network nodes are contemplated, and the discussion above regarding embodiments of $network_1$ 104, shall apply similarly to other networks, such as through network$_N$ 106. Network$_N$ 106 includes a node$_N$ 138 that according to certain embodiments, may be a proof of work miner, a proof of stake anchor node, or another processing system capable of executing functions as described herein within the network$_N$ 106. Node$_N$ 138 includes a token implementation function (TIF$_N$) 120 that implements the token within network$_N$ 106 and provides related functionality related to the token. These functions include and are not limited to a current balance function$_N$ 142 that tracks the total number of tokens on the network, a mint function$_N$ 144 that generates new tokens for use in transactions within the network, and a burn function$_N$ 146 that deletes tokens from the network. According to certain embodiments, the current balance function$_N$ 142 includes the current amount of the token on the network$_N$ 106, plus the number of tokens pending creation by the mint function$_N$ 144, less the number of tokens pending deletion by the burn function$_N$ 146, similar to that shown in (1) above.

These functions are carried out on network$_N$ 106 via one or more transactions such as transaction$_N$ 148, that is stored in a blockchain$_N$ 150 comprising an arbitrary number of blocks such as block$_N$ N 152, block$_N$ N+1 154, and block$_N$ N-1 156. It is understood that transaction$_N$ 148 may be included in the current block, depicted as block$_N$ N+1 152, prior to the current block being added to the blockchain.

Figure 2:
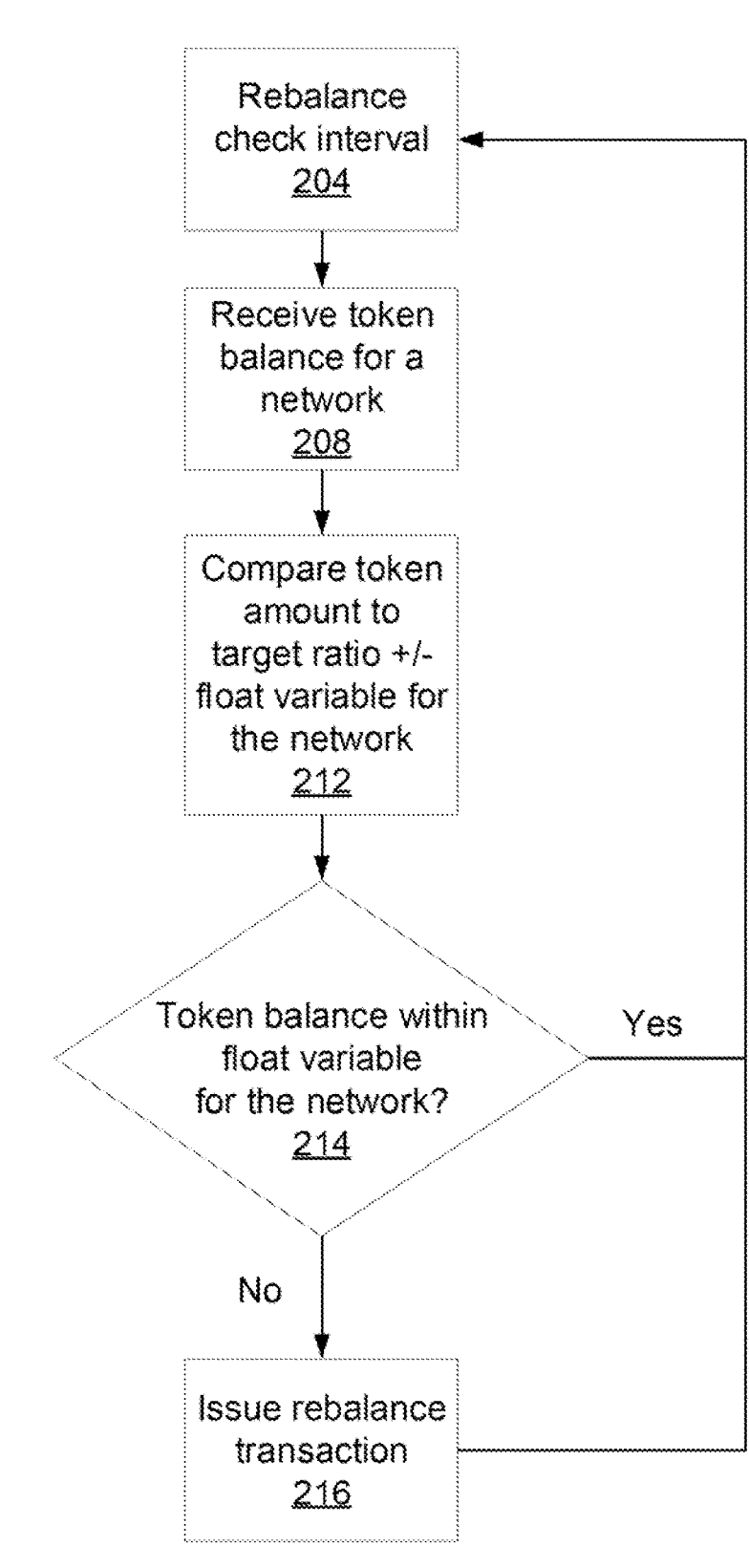
FIG. 2 depicts a flow diagram for a multi-blockchain token rebalancer, according to certain embodiments.

FIG. 2 depicts a flow diagram 200 for a multi-blockchain token rebalancer, according to certain embodiments. At block 204, the rebalancer 102 receives a signal at a check interval to check a token balance for a network such as network$_1$ 104, or more than one network. The check interval may be a periodic interval, such as every two minutes, 30 minutes, hour, day, multiple days, etc., as appropriate, that may be determined a configuration parameter (or setting) of rebalancer 102. According to certain embodiments, the check interval may be algorithmic and determined by transaction volume per unit of time on the network, or other networks coupled to the rebalancer 102, wherein a particular transaction volume per unit of time (e.g., M transactions per second/minute/hour) on a network may trigger a check interval. In some embodiments, the check interval may be set by a user. In some embodiments, the check interval may occur when a user of the network deposits or withdraws one or more tokens from the network.

At block 208, the rebalancer 102 generates a query for the current amount of the token on the network$_1$ 104 by querying the current balance function$_1$ 122 of TIF$_1$ 120, of network$_1$ 104, via the network$_1$ client 114.

At block 212, the rebalancer 102 compares the token amount (e.g., number of tokens) received from the network$_1$ 104 to the target ratio 108, and in some embodiments, the float variable values may be used to provide a range about each target ratio that the token amount for each network may fluctuate. As discussed above, the target ratio 108 is the desired ratio of the total amount of the token on each of the selected networks. For example, if there are 1000 total tokens across three networks, and the desired amount of the token on network A is 800 tokens (80% of the total amount of tokens), network B 150 tokens (15%), and network C 50 tokens (5%), the target ratio could be expressed as 0.80: 0.15:0.5. As is appreciated by one of skill in the art, other equivalent expressions may be used to define the quantitative relationships between the amounts of the token present on each network. According to certain embodiments, the target ratio 108 may be set algorithmically, based on the total number of tokens, the asset reserve backing the number of tokens, the token transaction volume per unit of time across each of the selected networks, average transaction size in number of tokens, etc.

As it is not uncommon that transactions on a network may cause fluctuations over time, the ratio of tokens across the various networks may fluctuate about their respective target ratio 108 value by a float variable value for each network, such as float variable$_1$ 110 through float variable$_N$ 112. For example, a network having an 80% target ratio value may have a large and continuous transactional volume of the token, causing a constant fluctuation of +/-10% about the target ratio value for that network. To avoid constant rebalancing transactions, a configuration parameter of the rebalancer may have may set the float variable value for this network to be +/-10%. According to certain embodiments, the float variable value for a given network may be defined in a token amount (e.g., +/-80 tokens, extending the above example), or total token value (e.g., +/1 USD$100 worth of the token). According to some embodiments, the float variable value for a given network may be algorithmically set based on transaction volume per unit of time, average token in transactions, and the like, with algorithmic limitations that take into account the total asset reserve value for the token and token transaction volumes and amount of the token on the other networks.

At block 214, the rebalancer 102 determines if the token amount on each selected network is at the target ratio value or in some embodiments within a range of the target ratio value based on the float variable. If the token amount for a given network is not the same as the target ratio value for that network, or outside of the range defined by the float variable for that network, it is considered to be 'out of balance.' For network(s) that are out of balance, the flow diagram proceeds to block 216 to bring the out-of-balance network(s) back into balance, otherwise returns to block 204.

At block 216, the rebalancer 102 issues a rebalance transaction for the network (e.g., may be multiple networks) that is out of balance. A rebalance transaction is discussed in greater detail below in connection with FIG. 3. In summary, the rebalance transaction will issue a transaction on a first network to bring the token amount on that network back to the target ratio value for that network, or in some networks, within the range defined by the float variable value for that network. The rebalance transaction will also issue a counter-transaction on a second network to ensure the total amount of the token across all networks complies with the asset reserves backing the token. For example, if the first network has an excess amount of the token, the rebalancer will issue a transaction request to the first network to conduct a burn transaction to remove excess tokens and a transaction request to a second network to conduct a mint transaction. In this context, the second transaction is chosen to have a token amount that will not exceed the target ratio value for that network or the range defined by the float variable. According to certain embodiments, the second transaction may be carried out on multiple networks if there is no single network that can remain in compliance with its target ratio or range about the target ratio.

Figure 3:
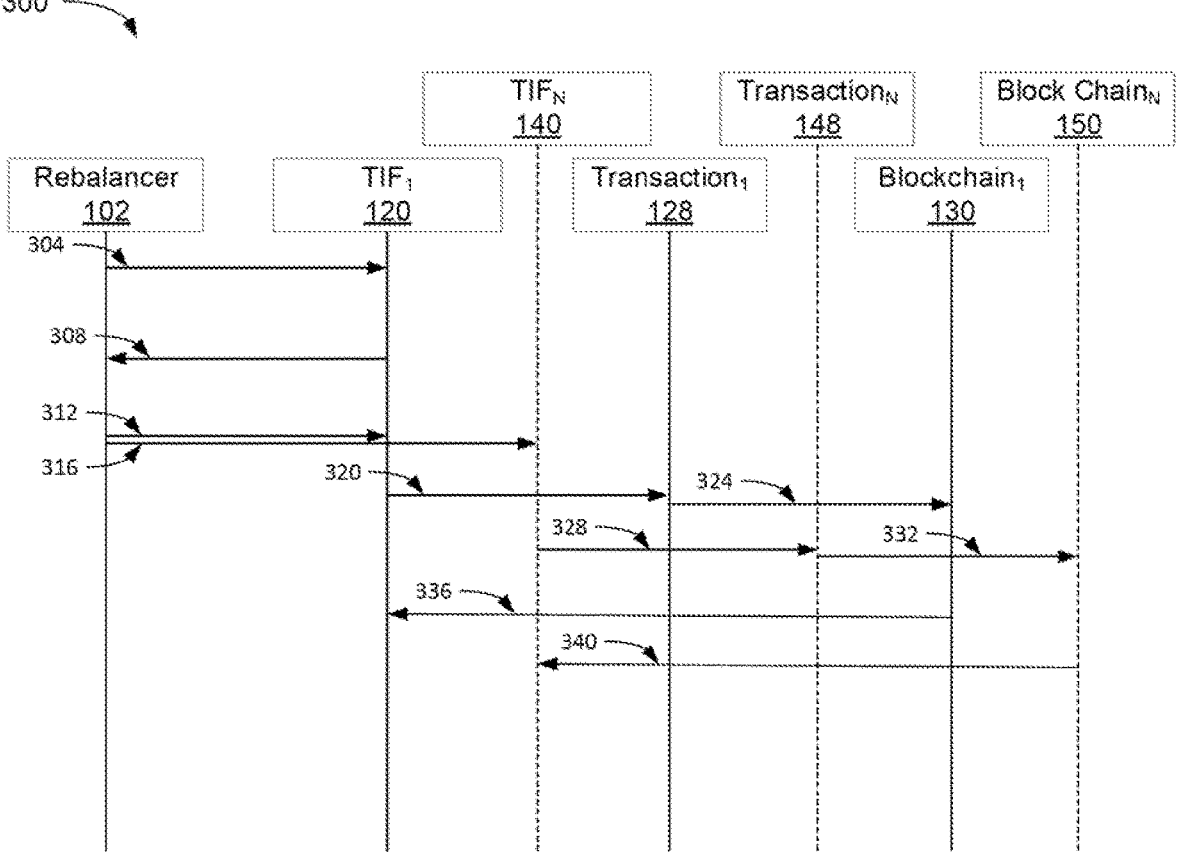
FIG. 3 depicts a timing diagram for a rebalancing transaction, according to certain embodiments.

FIG. 3 depicts a timing diagram 300 for a rebalancing transaction, according to certain embodiments. At arrow 304, the rebalancer 102 requests the current amount of the token on a first network, such as network$_1$ 104, which is carried out by the TIF$_1$ 120 by invoking the current balance function$_1$ 122. At arrow 308, the rebalancer receives the current amount of the token on network$_1$ 104 and total amount of the token across all networks, and compares these to the target ratio 108 value for the network, and in some embodiments, to the range about the target ratio value defined by the float variable$_1$ 110 for the network.

If the token amount for the network$_1$ 104 is out of balance, the rebalancer issues a rebalancing transaction to network$_1$ 104 TIF$_1$ 120, to execute the rebalance transaction—a mint function$_1$ 124 or burn function$_1$ 126 depending on how the token amount for network$_1$ 104 is out of balance, at arrow 312. At arrow 316, the rebalancer issues a rebalancing counter transaction request to TIF$_N$ 140. For example, if the rebalancing transaction is a mint transaction, the rebalancing counter transaction will be a burn transaction, and vice-versa, in order to maintain the total amount of the token across all selected networks (e.g., to comply with asset reserve requirements). According to certain embodiments, the rebalancing counter transaction request is issued to a network that can absorb this transaction, or may be in need of balancing in the manner requested by this transaction. In some embodiments, the rebalancing counter transaction may be issued in parts to multiple networks, for example, where one network is cannot absorb this transaction alone (e.g., will cause the network to go out of balance). Alternatively, if there are sufficient tokens held in reserve (e.g., not on any network) to counter the rebalancing transaction, the rebalancer 102 does not issue a rebalancing counter transaction. In some embodiments, the rebalancing counter transaction may be partially fulfilled by tokens held in reserve, and by one or more networks.

Although the rebalancing transaction issued at arrow 312 is shown to be preceding the rebalancing counter transaction at arrow 316, these may be issued simultaneously, or the rebalancing counter transaction of arrow 316 may issue prior to the rebalancing transaction of arrow 312.

At arrow 320, the TIF$_1$ 120 executes the function to meet the rebalancing transaction request (e.g., a mint or a burn), and at arrow 324 issues the transaction$_1$ 128 to the blockchain$_1$ 130 to record the rebalancing transaction.

At arrow 328, the TIF$_N$ 140 executes the function to meet the rebalancing counter transaction request (e.g., a burn or a mint transaction), and at arrow 332, issues the transaction 148 to the blockchain$_N$ 150 (e.g., a blockchain different than the rebalancing transaction) to record the rebalancing counter transaction.

Although arrow 320 and arrow 324 are shown to be preceding arrow 328 and arrow 332 in time, this ordering may be reversed or interleaved (e.g., arrow 328, followed by arrow 320, followed by arrow 332, followed by arrow 324).

At arrow 336, blockchain$_1$ 130 confirms the rebalancing transaction to TIF$_1$ 120, which causes the current balance function$_1$ 122 to reflect the updated total amount of the token in network$_1$ 104. At arrow 340, blockchain$_N$ 150 confirms the rebalancing counter transaction to TIF$_N$ 140, which causes the current balance function 122 to reflect the updated current total amount of the token in network$_N$ 106.

Although the example depiction of FIG. 3 shows network$_1$ 104 being rebalanced, it is understood that network$_1$ 104 is an arbitrary network of the selected networks, representing any network of the selected networks that is indicated to be in need of rebalancing, for example, in accordance with the discussion above in connection with FIG. 2.

FIG. 4 depicts a flow diagram 400 of a user transaction request, according to certain embodiments. At block 404, a user transaction request for the token is made on a transaction platform (not shown) to deposit (or withdraw) an amount of the token. At block 408, if the network to transact upon has been programmed into the transaction platform, then at block 412, a mint (e.g., deposit) or burn (e.g., withdrawal) of the token in the transaction amount is made on the specified network after which the flow diagram proceeds to the rebalance check interval at block 204 of FIG. 2 to follow that process to rebalance the token amount on the specified network as needed.

At block 416, if the network has not been programmed into the transaction platform, then a user-specified network is selected to mint or burn the token in the transaction amount before proceeding to rebalance the token amount on the user-specified network at the rebalance check interval at block 204.

Example Method

FIG. 5 depicts a method 500 for multi-blockchain token rebalancing, according to certain embodiments.

At block 504, the rebalancer 102 determines a target ratio that defines a first quantitative relationship between an amount of a token present on each blockchain of a plurality of blockchains. According to certain embodiments, the target ratio is further based on a second ratio defining a second quantitative relationship between a transaction volume of transactions involving the token for transactions on each of the plurality of blockchains. According to certain embodiments, the first amount of the token is received at a time interval. According to certain embodiments, the first amount of the token is received upon initiating a transaction involving the token on the first blockchain. According to certain embodiments, the first amount of the token comprises a current balance of the token on the first blockchain plus one or more pending mint transactions for the token on the first blockchain, minus one or more pending burn transactions for the token on the first blockchain.

At block 508, a first amount of the token is received on a first blockchain of the plurality of blockchains, such as depicted in the received token balance for a network at block 208 of FIG. 2.

At block 512, the rebalancer compares the first ratio to the target ratio and generates a ratio difference.

At block 516, the rebalancer executes a rebalancing transaction on the first blockchain, based on the ratio difference. According to certain embodiments, executing the rebalancing transaction is based on the ratio difference exceeding a float variable. According to certain embodiments, the float variable is based on a transaction volume of the first blockchain of transactions involving the token. According to certain embodiments, the rebalancing transaction is one of a mint transaction or a burn transaction.

Example Processing System

Figure 6:
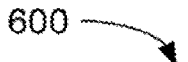
FIG. 6 depicts an example processing system for a multi-blockchain rebalancer 102, according to certain embodiments.

FIG. 6 depicts an example processing system 600 for a multi-blockchain rebalancer 102, according to certain embodiments. FIG. 6 depicts an example processing system 600 in the multi-blockchain rebalancing system that may used to perform the methods described herein, such as the described with respect to FIGS. 2-5.

Processing system 600 includes a central processing unit (CPU) 602 connected to a data bus 616. CPU 602 is configured to process computer-executable instructions, e.g., stored in memory 608 or storage 610, and to cause the processing system 600 to perform methods described herein, for example, with respect to FIGS. 2-5. CPU 602 is included to be representative of a single CPU, multiple CPUs, a single CPU having multiple processing cores, and other forms of processing architecture capable of executing computer-executable instructions.

Processing system 600 further includes input/output (I/O) device(s) 612 and interfaces 604, which allows processing system 600 to interface with input/output devices 612, such as, for example, keyboards, displays, mouse devices, pen input, and other devices that allow for interaction with processing system 600. Note that processing system 600 may connect with external I/O devices through physical and wireless connections (e.g., an external display device).

Processing system 600 further includes a network interface 606, which provides processing system 600 with access to external network 614 and thereby external computing devices.

Processing system 600 further includes memory 608, which in this example includes a determining component 618, a receiving component 620, a comparing component 624, and an executing component 626 for performing operations described in connection with FIGS. 2-5.

Note that while shown as a single memory 608 in FIG. 6 for simplicity, the various aspects stored in memory 608 may be stored in different physical memories, including memories remote from processing system 600, but all accessible by CPU 602 via internal data connections such as bus 616.

Storage 610 further includes target ratio data 628, which may be like the target ratio, as described in FIGS. 1-5.

Storage 610 further includes token data 630, which may be like the token data discussed in connection with FIGS. 1-5.

Storage 610 further includes blockchain data 632, which may be like the blockchain as described in connection with FIGS. 1-5.

Storage 610 further includes token amount data 634, which may be like the token amount described in connection with FIGS. 1-5.

Storage 610 further includes ratio difference data 638, which may be like the ratio difference described in connection with FIGS. 1-5.

Storage 610 further includes rebalancing transaction data 640, which may be like the rebalancing transaction described in connection with FIGS. 1-5.

While not depicted in FIG. 6, other aspects may be included in storage 610.

As with memory 608, a single storage 610 is depicted in FIG. 6 for simplicity, but various aspects stored in storage 610 may be stored in different physical storages, but all accessible to CPU 602 via internal data connections, such as bus 616 or external connection, such as network interfaces 606. One of skill in the art will appreciate that one or more elements of processing system 600 may be located remotely and accessed via a network 614.

The preceding description is provided to enable any person skilled in the art to practice the various embodiments described herein. The examples discussed herein are not limiting the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A non-transitory computer-readable storage medium storing instruction that, when executed by a processor of a processing system, cause the processing system to perform a method, the method comprising:

determining a target ratio defining a proportion of an amount of a token allowed to be maintained on each blockchain of a plurality of blockchains on which the token is minted relative to a total extant amount of the token across the plurality of blockchains, wherein the target ratio is determined based at least in part on one or more of (1) transaction volumes associated with the token on each blockchain of the plurality of blockchains or (2) an aggregate amount of tokens involved in transactions performed on each blockchain of the plurality of blockchains;

receiving a signal at a periodic check interval to check a token balance for a first blockchain of the plurality of blockchains;

generating a periodic query for a current amount of the token on the first blockchain;

based on the receiving the signal, receiving the current amount of the token on the first blockchain, wherein the current amount of the token includes tokens pending token minting transactions on the first blockchain and excludes tokens pending token burning transactions on the first blockchain;

comparing the current amount to the target ratio and generating a ratio difference; and executing a periodic rebalancing transaction on the first blockchain, based on the ratio difference exceeding a threshold ratio difference, the executing comprising:

adjusting, via one or more token minting or token burning transactions, the amount of the token present on the first blockchain such that a ratio of the adjusted amount of the token present on the first blockchain to the total extant amount of the token complies with the target ratio, and based on the adjusting the amount of the token present on the first blockchain, executing one or more corresponding token burning or token minting transactions on one or more other blockchains of the plurality of blockchains such that a total amount of the token present across the plurality of blockchains after executing the periodic rebalancing transaction equals the total extant amount of the token.

2. The non-transitory computer-readable storage medium of claim 1, wherein the executing of the periodic rebalancing transaction is based on to the ratio difference exceeding a float variable.

3. The non-transitory computer-readable storage medium of claim 2, wherein the float variable is based on a transaction volume of the first blockchain, of transactions involving the token.

4. The non-transitory computer-readable storage medium of claim 1, wherein the periodic check interval is based on a time interval.

5. The non-transitory computer-readable storage medium of claim 1, wherein the periodic check interval is triggered based upon initiating a transaction involving the token on the first blockchain.

6. The non-transitory computer-readable storage medium of claim 1, wherein the periodic rebalancing transaction comprises a mint transaction on the first blockchain and one or more burn transactions on the one or more other blockchains when the ratio difference indicates that a token deficit relative to the target ratio exists on the first blockchain.

7. A system comprising:

a memory comprising computer-readable instructions;

a processor coupled to the memory and configured to read the computer- readable instructions, that cause the processor to:

determine a target ratio defining a proportion of an amount of a token allowed to be maintained on each blockchain of a plurality of blockchains on which the token is minted relative to a total extant amount of the token across the plurality of blockchains, wherein the target ratio is determined based at least in part on one or more of (1) transaction volumes associated with the token on each blockchain of the plurality of blockchains or (2) an aggregate amount of tokens involved in transactions performed on each blockchain of the plurality of blockchains;

receive a signal at a periodic check interval to check a token balance for a first blockchain of the plurality of blockchains;

generate a periodic query for a current amount of the token on the first blockchain;

based on the receiving the signal, receive the current amount of the token on the first blockchain, wherein the current amount of the token includes tokens pending token minting transactions on the first blockchain and excludes tokens pending token burning transactions on the first blockchain;

compare the current amount to the target ratio and generating a ratio difference; and execute a periodic rebalancing transaction on the first blockchain, based on the ratio difference exceeding a threshold ratio difference, the executing comprising:

adjust, via one or more token minting or token burning transactions, the amount of the token present on the first blockchain such that a ratio of the adjusted amount of the token present on the first blockchain to the total extant amount of the token complies with the target ratio, and based on the adjusting the amount of the token present on the first blockchain, executing one or more corresponding token burning or token minting transactions on one or more other blockchains of the plurality of blockchains such that a total amount of the token present across the plurality of blockchains after executing the periodic rebalancing transaction equals the total extant amount of the token.

8. The system of claim 7, wherein the executing of the periodic rebalancing transaction is based on to the ratio difference exceeding a float variable.

9. The system of claim 8, wherein the float variable is based on a transaction volume of the first blockchain, of transactions involving the token.

* * * * *